July 16, 1963  R. A. BROCKBANK  3,097,874
GRAPNELS FOR SUBMARINE CABLES
Filed March 12, 1962  2 Sheets-Sheet 1

ROBERT A. BROCKBANK.
INVENTOR,

BY Hall & Houghton

ATTORNEY

July 16, 1963  R. A. BROCKBANK  3,097,874
GRAPNELS FOR SUBMARINE CABLES
Filed March 12, 1962  2 Sheets-Sheet 2

INVENTOR
ROBERT A. BROCKBANK,
BY Hall + Houghton
ATTORNEY

United States Patent Office 3,097,874
Patented July 16, 1963

3,097,874
GRAPNELS FOR SUBMARINE CABLES
Robert Alston Brockbank, Kenton, Harrow, Middlesex, England, assignor to Her Majesty's Postmaster General, London, England
Filed Mar. 12, 1962, Ser. No. 178,981
8 Claims. (Cl. 294—66)

This invention relates to grapnels for recovering submarine cables and particularly to grapnels for recovering telecommunication cables laid in deep water.

With unarmoured lightweight cable such as that described in the specification of British Patent No. 703,782, it is often possible to bring up a bight of cable to the surface and recovery of the cable in a bight can result in a much more rapid repair being made. It is important, if damage caused to the cable by grappling is to be reduced or eliminated, that the operator shall know as soon as possible when the cable has been hooked. Hitherto, it has been the practice to rely on an increase in the tension in the grappling rope to serve as an indication that the cable has been hooked, but even with armoured cable the conditions encountered in practice are such that the cable may be dragged across the sea bottom for some considerable distance before it is known for certain that it has been hooked. With unarmoured lightweight cable the difficulties are increased, for not only is the cable much lighter than armoured cable, but also it is much more liable to suffer damage as a result of being dragged along the sea bottom.

It is an object of the present invention to provide an improved grapnel which reduces the risk of damage to the cable and which emits a signal when the cable has been hooked.

According to the invention the grapnel is provided with pulleys each of which lies at the root of a prong of the grapnel and each of which is coupled to a signalling device such that when any of the pulleys is rotated an acoustic signal is emitted into the water.

Preferably, the signalling device is common to all the pulleys although it may be operated by them in a different manner for each direction of rotation of the pulleys.

The signalling device may be mechanical in form and operation, for example it may be a resonant rod set into vibration mechanically, or it may be an electrical device, for example an electrical oscillator.

In one particular embodiment of the invention, the pulleys rotate cams through free wheel mechanisms and the cams operate through a suitable linkage a mechanical hammer which vibrates a resonator rod.

By way of example, embodiments of the invention will now be described in conjunction with the accompanying drawings in which.

Figures 1, 2:
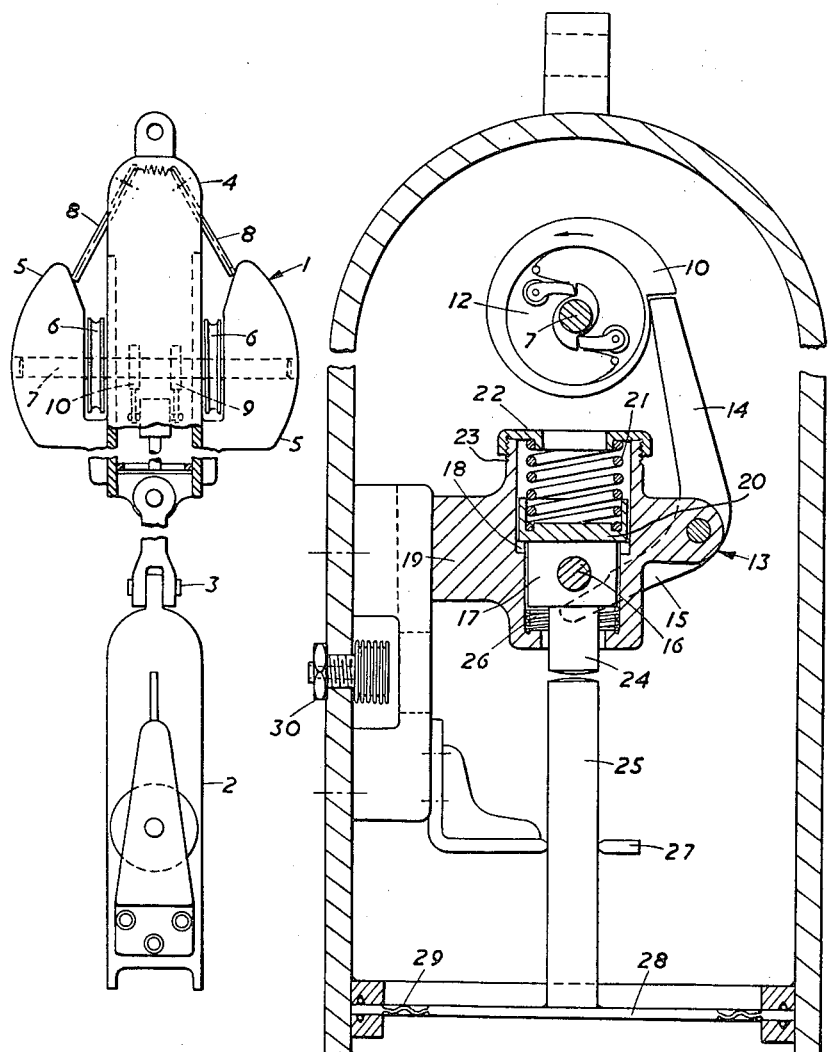
FIG. 1 shows in outline a first embodiment of the invention.
FIG. 2 illustrates in section one of two signalling mechanisms incorporated in the grapnel of FIG. 1.

Referring to FIG. 1, the grapnel consists of two similar parts 1, 2 connected together in tandem by a hinged connecting link 3.

Each part comprises a cylindrical housing 4 forming a support for two prongs 5. Between each prong 5 and the housing 4 is a pulley 6 keyed to a common shaft 7 passing diametrically through the housing. A spring-loaded gate 8 is provided to close the gap between the point of the prong 5 and the housing 4 so that when the cable has been hooked, it cannot accidentally be released. When the cable is hooked, it will lie in the groove of one of the pulleys, and if the major axis of the grapnel does not lie at right angles to the run of the cable, the grapnel will slide along the cable, thereby causing the pulley, and the shaft to which it is keyed, to rotate.

Within the housing the shaft carries two cams 9, 10, of opposite hand, driven from the shaft via free wheels 11, 12 respectively, the free wheels also having opposite directions of drive. Thus, one or other of the cams is rotated, according to the direction of rotation of the shaft. In FIG. 2, one, 10, of the cams with its associated free wheel 12 is illustrated. Cam 10 is driven in an anticlockwise direction as seen in the drawing when the shaft rotates in that direction but it remains stationary when the shaft rotates in the clockwise direction. The converse is true for the other cam 9 mounted on the same shaft.

Each cam has associated with it a bell-crank lever, for example lever 13 is associated with cam 10, and the longer arm 14 of the lever bears against the cam whilst the shorter arm 15 is disposed beneath a shaft 16 which passes diametrically through a cylinder hammer 17 movable in a bore 18 of a bracket 19 contained in the housing 4. Supported upon the hammer 17 is a cup-like member 20 in which rests one end of a heavy compression spring 21 whose other end is in contact with a cap 22 screwed over a boss 23 on the bracket 19. The hammer 17 has a central depending boss 24 which projects from the bore 18 and is held just clear of one end of a resonator rod 25 by a light spring 26.

The resonator rod is clamped rigidly at its centre by clamp 27 and its other end is fixed to the centre of a rigid disc 28 joined by a flexible fluid-tight surround 29 to the wall of the housing 4. The disc 28 and the surround 29 seal the end of the housing which may be filled with oil or other suitable liquid. Attached to the inner surface of the wall of the housing 4 is a resilient element, for example a metallic bellows 30, one side of which is exposed to the hydrostatic pressure outside the housing when the grapnel is in use so that the pressure within the housing is at all times equal to the external hydrostatic pressure when the grapnel is in use.

As a cam rotates, the associated bell-crank lever lifts the hammer against the heavy compression spring. On completion of one revolution of the cam the bell-crank is released and the hammer is driven downwards to strike the end of the resonator rod. The resonator rod is set into longitudinal vibration by the hammer blow and the longitudinal vibration of the bar is communicated to the surrounding water via the disc. The light spring serves to prevent the face of the hammer from remaining in contact with the end of the resonator.

When the grapnel is dragged along the ocean floor it is not possible to predict which pulley will engage the cable, and in general the direction of rotation of the pulley will not be known. But the arrangement of the cams and free wheels ensures that irrespective of direction of rotation, a signal will be emitted into the water.

Preferably, the dimensions of the resonator are such that the sound emitted has a fundamental frequency of the order of 10 kc./s. The signal can be received at the cable ship by means of hydrophones of known type.

In an alternative form each pulley is fixed to its own shaft, each shaft carrying a pair of free wheels and cams, the free wheels of a pair being arranged to transmit torque in opposite directions. Each cam has at least three steps which are spaced around its periphery by unequal intervals. For one cam of a pair the steps might be at 0°, 30° and 90° while for the other they might be at 270°, 330° and 360° (or 0°). Then if the pulley rotates in one direction the signal pattern consists of two pulses separated by a short interval followed by a third pulse after an interval twice as long whereas if the pulley rotates in the opposite direction, the pattern consists of a single pulse followed by two pulses separated by an interval which is only half as long as that separating the single pulse from the next following pulse. It is therefore possible to detect in which direction the pulley is rotating and, therefore, to deduce in which direction the grapnel is sliding along the cable. It is obviously necessary to arrange that for each pulley the free wheels and cams are so arranged that a particular signal pattern is always to be associated with the same direction of motion along the cable, irrespective of the identity of the pulley which has engaged the cable, bearing in mind that the pulley which engages the cable will always be on the underside of the grapnel at the moment when it engages the cable.

In the embodiment which has been described the signal is generated mechanically. It will be appreciated however that electrical means can be employed.

In such a case it would not be necessary to provide for an extremely rapid change in the cam profile since the cam operates a pair of contacts serving to key an electrical oscillator connected to an electromechanical transducer. Such a cam could therefore operate in either direction and no free wheel would be necessary. Energy for the oscillator would be supplied by a local battery housed in the grapnel. Each pulley would be associated with its own cam, so arranged that the direction of motion of the grapnel along the cable can be determined by interpretation of the signal pattern.

Figure 3:
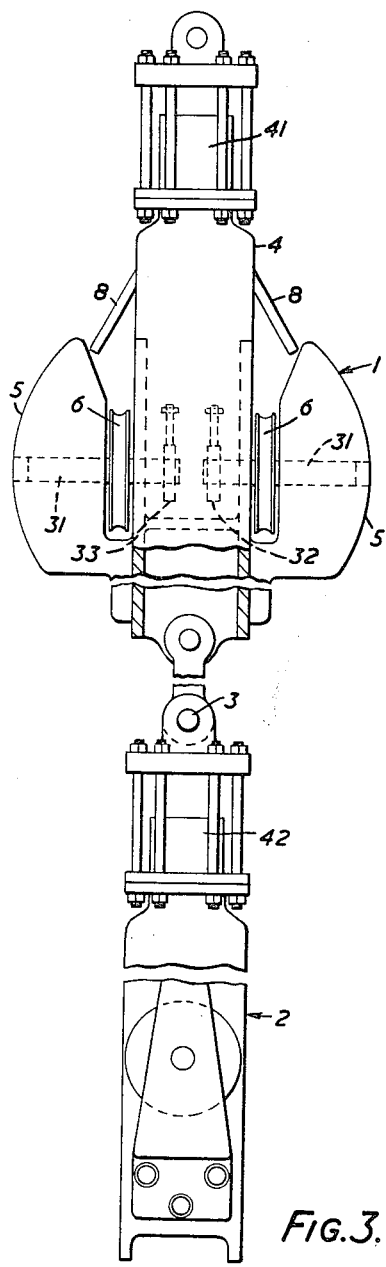
FIG. 3 shows in outline a second embodiment of the invention, and, FIG. 4 shows in greater detail the signalling equipment incorporated in the embodiment of FIG. 3.
Figure 4:
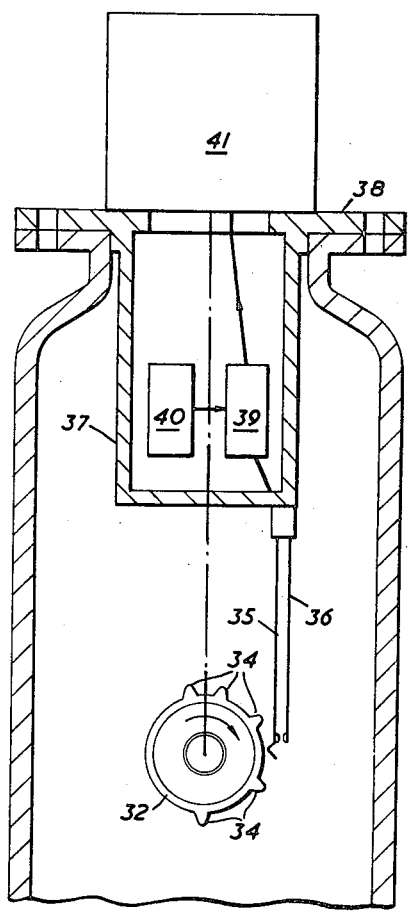

The embodiment of the invention shown in FIGS. 3 and 4 employs electrical signal generating means.

The embodiment is generally similar to that described above with reference to FIGS. 1 and 2. Those parts which are identical with parts of the embodiment of FIGS. 1 and 2 have been given the same reference numerals as are used in FIGS. 1 and 2.

In FIGS. 3 and 4, each of the pulleys 6 is mounted upon its own shaft 31 which carries discs 32, 33, each having spaced projections 34. Each disc operates a set of contact-carrying strips, one such set, 35, 36 associated with disc 32, being shown in FIG. 2.

Located in a housing 37 forming part of a flanged closure member 38 for the housing 4 is an electric oscillator represented by block 39 and powered by batteries represented by block 40. The output of the oscillator is connected to a transducer 41 located externally of the housing 4 as indicated in FIG. 3. The transducer may, for example, be a magneto-strictive ring stack transducer having the construction illustrated on page 188 of "Underwater Acoustics Handbook" by V. M. Albers published by Pennsylvania State Univ. Press in 1960.

Both sets of contact carrying strips are joined to the oscillator 39 and key the latter in a manner determined by the spacing of the projections 34. Thus, by arranging the spacing differently on the discs, the pattern of signals emitted by the transducer 41 indicates which of the pulleys 6 is rotating and by a suitable disposition of the projections the signal pattern can also indicate in which direction, i.e. clockwise or anticlockwise, the pulley is rotating.

The part 2 of the grapnel shown in FIG. 3 is constructed in like manner to part 1. Part 2 has its own transducer 42 operated by contacts actuated by pulley 6 at the root of the prongs on that part, those prongs being at right angles to the prongs 5 of the part 1.

If desired, the contacts in the parts 1 and 2 could operate a common oscillator driving a single transducer.

The webs of the pulleys may have a series of spaced apertures formed in them to allow each pulley to be locked against rotation by means of a short length of rod which is passed through an appropriate pair of apertures in the pulley to be locked. Locking may be required to guard against cable movement when, after a bight of cable has been hauled to the surface, a "stopper" is to be applied to the cable.

I claim:

1. A submarine cable grapnel comprising in combination, a body portion, cable prongs extending externally from the body portion, cable pulleys rotatably mounted at the roots of the prongs, an acoustic signal emitter mounted on said body portion, and means for energising the emitter on rotation of any one of the pulleys.

2. A submarine cable grapnel comprising in combination, a body portion, cable prongs extending externally from the body portion, cable pulleys rotatably mounted at the roots of the prongs for engaging a cable hooked by a prong, a mechanically operated transducer located within the body portion, and means for translating rotation of the said cable pulleys into energisation of the transducer.

3. A submarine cable grapnel comprising in combination, a body portion, cable prongs extending externally from the body portion, and, at the root of each prong, a freely rotatable axle, a pulley mounted upon the axle, cam means secured to the axle, and a mechanically operated transducer located within the body portion, and linkages operated by the cam means for translating rotation of the cam means into movement of the transducer indicative of the direction of rotation of the axle carrying the cam means.

4. A submarine cable grapnel comprising in combination a sealed body portion, at least one pair of cable prongs, the prongs of a pair extending externally from the body portion in opposite directions on the same level of the body portion, and, between every pair of prongs, an axle rotatably mounted in the body portion, pulleys mounted upon the axles externally of the body portion, each pulley lying at the root of a prong, cams mounted upon the axles inside the body portion, clutches connecting the cams with the axle on which they are mounted, a resonator rod mounted inside the housing, a hammer slidably mounted within the housing for striking the resonator rod, and linkages connecting the cams with the hammer for driving the latter into striking engagement with the resonator rod.

5. A submarine cable grapnel as claimed in claim 4 and further comprising a pressure equalising device mounted in the body portion for equalising the pressure inside the body portion with the pressure outside the body portion.

6. A submarine cable grapnel comprising in combination a body portion, cable prongs extending externally from the body portion, cable pulleys rotatably mounted at the roots of the prongs for engaging a cable hooked by the latter, an electrically operated transducer, and, means for energising the transducer on rotation of a pulley.

7. A submarine cable grapnel comprising in combination a body portion, cable prongs extending externally from the body portion, and, at the root of each prong, a freely rotatable axle, a pulley mounted upon the axle for engaging a cable hooked by the prong, an electrically operated transducer mounted on said body portion, switch means for keying the transducer, and cam means on the axle for operating the switch means.

8. A submarine cable grapnel comprising in combination a body portion, a pair of cable prongs of which the prongs extend externally of the body portion in opposite directions, two axles each rotatably mounted in the body portion, a pulley on each axle arranged externally of the body portion, each pulley lying at the root of one of the prongs, switch operating devices mounted upon the axles inside the body portion, an electrically operated transducer, and switch means for keying the transducer, said switch means being operable by the switch operating means on rotation of the axle on which the switch operating means are mounted.

References Cited in the file of this patent
UNITED STATES PATENTS
265,720    Trott et al. _____ Oct. 10, 1882